United States Patent [19]

Tolley

[11] Patent Number: 5,762,415

[45] Date of Patent: Jun. 9, 1998

[54] LAMP ASSEMBLY

[75] Inventor: Robert Frank Tolley, Staffordshire, England

[73] Assignee: Lucas Industries, plc, England

[21] Appl. No.: 583,344

[22] Filed: Jan. 5, 1996

[30]    Foreign Application Priority Data

Jan. 7, 1995 [GB] United Kingdom ............... 9500295

[51] Int. Cl.$^6$ ........................................ B60Q 1/06
[52] U.S. Cl. .................... 362/66; 362/428; 362/421; 362/287
[58] Field of Search ............................. 362/66, 80, 421, 362/289, 287, 419, 428; 403/90, 142, 326, 141

[56]            References Cited

U.S. PATENT DOCUMENTS

| 4,894,754 | 1/1990  | Levilain        | 362/421 |
| 4,974,123 | 11/1990 | Luallin et al.  | 362/421 |
| 5,128,841 | 7/1992  | Maglica et al.  | 362/421 |
| 5,322,252 | 6/1994  | Puente          | 362/421 |
| 5,428,511 | 6/1995  | Luallin et al.  |         |
| 5,428,519 | 6/1995  | Salmon et al.   | 362/421 |
| 5,526,238 | 6/1996  | Van Oel et al.  | 362/421 |

FOREIGN PATENT DOCUMENTS 2 463 311   2/1981   France .

*Primary Examiner*—Thomas M. Sember
*Attorney, Agent, or Firm*—Andrus, Sceales, Starke & Sawall

[57] ABSTRACT

A lamp assembly comprises a reflector body having a rear opening for receiving a replaceable light bulb. The reflector body is adjustably mounted on a support by an adjustment mechanism comprising a plurality of ball-and-socket joints. The socket of each joint is defined by a pair of arms having mutually co-operating socket parts. The arms of said pair are pivotally secured together for relative movement between a closed position in which the respective ball is held in the socket defined by the socket parts of the pair of arms, and an open position in which the respective ball of the joint can be engaged with/disengaged from the respective socket. A latch mechanism is provided for releasably retaining the pair of arms in said relatively closed position.

5 Claims, 2 Drawing Sheets

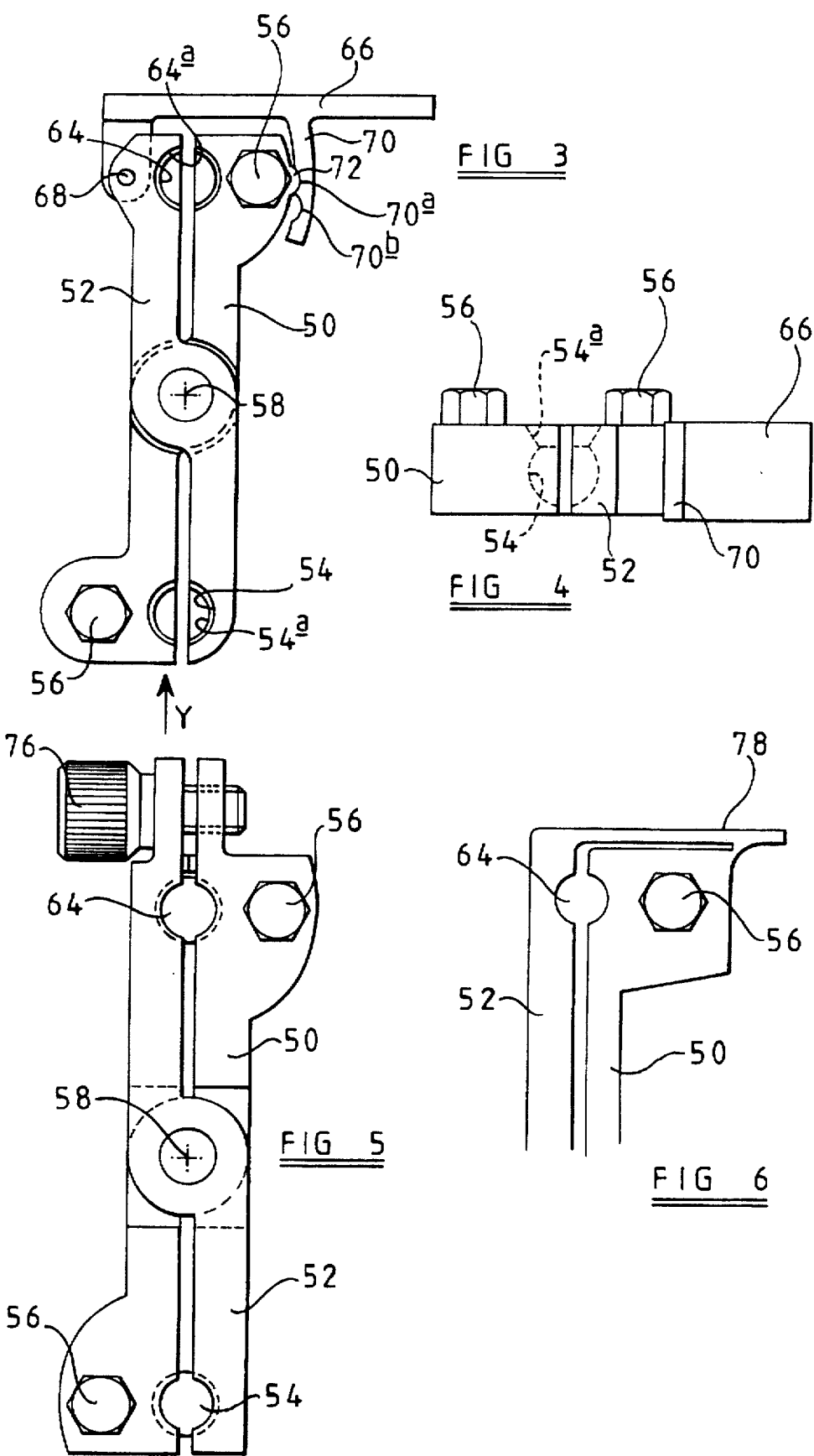

LAMP ASSEMBLY

This invention relates to a lamp assembly and is particularly, but not exclusively, concerned with a road vehicle headlamp assembly.

In a road vehicle headlamp assembly, it is necessary to ensure that a reflector body of the assembly is correctly aimed so that it provides adequate illumination of the road without dazzling drivers of oncoming vehicles. For this purpose, it is necessary to mount the reflector body of the headlamp assembly on a support fixed relative to the body of the road vehicle in such a way that the reflector body can be adjusted by independent tilting movement about horizontal and vertical axes. It is common practice in vehicle headlamps to provide mount the reflector body on the support through three ball-and-socket joints each having a limited amount of universal pivotal movement. In such an arrangement, three part-spherical sockets which open rearwardly of the lamp assembly are provided on the rear of the reflector body in spaced apart relationship so that first and third sockets are horizontally aligned whilst the second and third sockets are vertically aligned. First and second part-spherical balls on the end of respective adjusting screws are snap-fitted into the respective first and second part-spherical sockets. A part-spherical ball on the end of a post is snap-fitted into the third part-spherical socket. The post is fixed to the support, whilst the first and second adjusting screws are rotatably engaged in respective screw-threaded apertures in the support. With such an arrangement, rotation of the first adjusting screw causes the reflector body to be pivoted about the vertical axis passing through the second and third joints, whilst rotation of the second screw causes the reflector body to be pivoted about the horizontal axis passing through the first and third joints.

The reflector body has a rear opening in which a light bulb is mounted. Periodically, the light bulb has to be replaced and this can be a difficult task, particularly if the space behind the reflector body is restricted It is an object of the present invention to provide a lamp assembly construction whereby light bulb replacement is facilitated.

According to the present invention, there is provided a lamp assembly comprising a reflector body having at least one rear opening which, in use, receives a replaceable light bulb; a support; and means for adjustably mounting the reflector body on the support, said means comprising a plurality of ball-and-socket joints, wherein the socket of each joint is defined by a pair of arms having mutually co-operating socket parts, the arms of said pair being secured together for relative pivotal movement between a relatively closed position in which the respective ball is held in the socket defined by the socket parts of the pair of arms, and a relatively open position in which the respective ball of the joint can be engaged with/disengaged from the respective socket, and wherein means are provided for releasably retaining the pair of arms in said relatively closed position.

With such an arrangement, it is possible to move the pair(s) of arms into their relatively open positions whereby the reflector body can be completely detached from the support for light bulb replacement or other servicing purposes. Preferably, means are also provided for releasably retaining the pair of arms in said relatively open position.

The present invention is particularly applicable to lamp assemblies where there are three ball-and-socket joints, and wherein each arm of one pair has two spaced socket parts therein which cooperate with respective spaced socket parts of the other arm of the pair so that two of the three sockets are defined by a single pair of said arms, there being a further pair of arms defining the remaining socket. Where there is a single pair of arms defining two sockets, the pivotal connection between such pair of arms preferably lies between the two sockets.

The releasable means for retaining the or each pair of arms in said closed position may take the form of a screw which can be engaged with both members to hold the latter releasably in said relatively closed position. However, it is preferred for the releasable means to comprise a latch element on one of the arms which snap-engages with a cooperating formation on the other arm to retain the pair of arms in said closed position. Said other arm may have a further cooperating formation thereon which is arranged to retain the pair of arms in the relatively open position.

Embodiments of the present invention will now be described, by way of example, with reference to the accompanying drawings, in which:

FIG. 3 is a rear view of a second pair of arms defining second and third sockets illustrated in FIG. 2.

FIG. 4 is a view in the direction of arrow Y in FIG. 3.

FIG. 5 is a rear view of a modification, and

FIG. 6 is a rear view of a still further modification.

Figure 1:
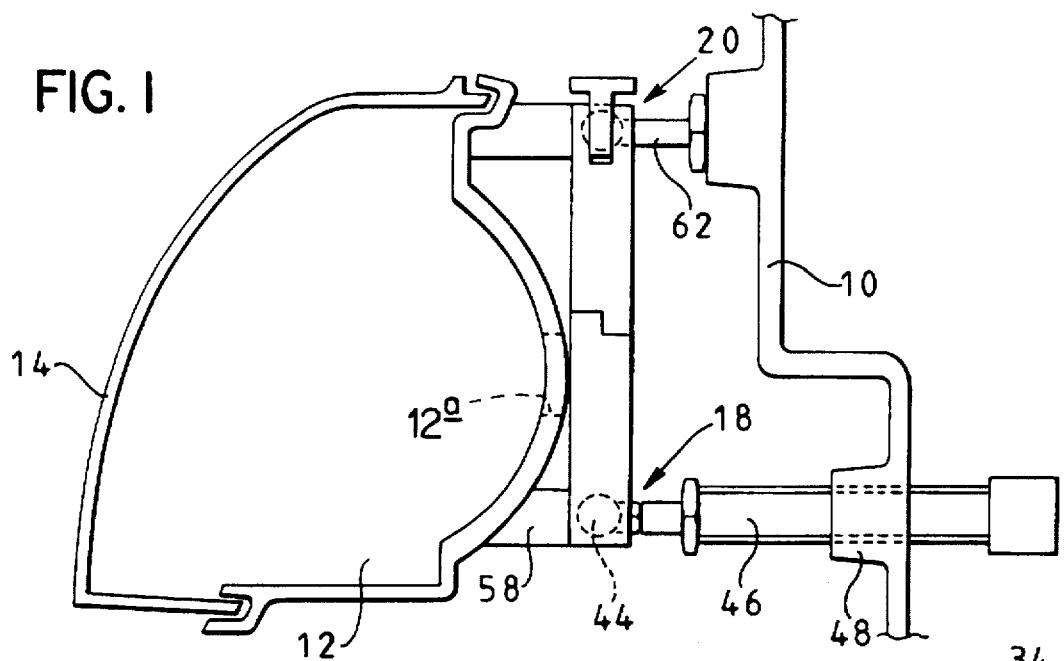
FIG. 1 is a schematic view of an automobile headlamp assembly according to the present invention.

Referring now to the drawings, the road vehicle headlamp assembly comprises a support 10 which, in use, is fixedly mounted on the road vehicles a reflector body 12 including a transparent front cover 14, and first, second and third ball-and-socket joints indicated generally by respective arrows 16, 18 and 20 which serve to mount the reflector body 12 on the support 10. Because of the view chosen, the first ball-and-socket joint 16 is not shown in FIG. 1 because it is masked for the most part by the third ball-and-socket joint 20. The reflector body 12 has a rear opening 12a therein for receiving a replaceable light bulb (not shown).

Figure 2A:
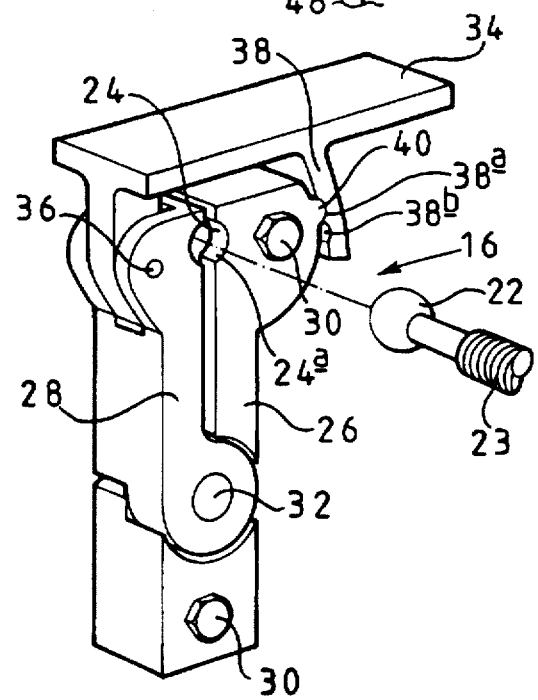
FIG. 2 is a perspective view on a larger scale showing in more detail the construction of ball-and-socket joints employed in the headlamp assembly of FIG. 1.
Figure 2B:
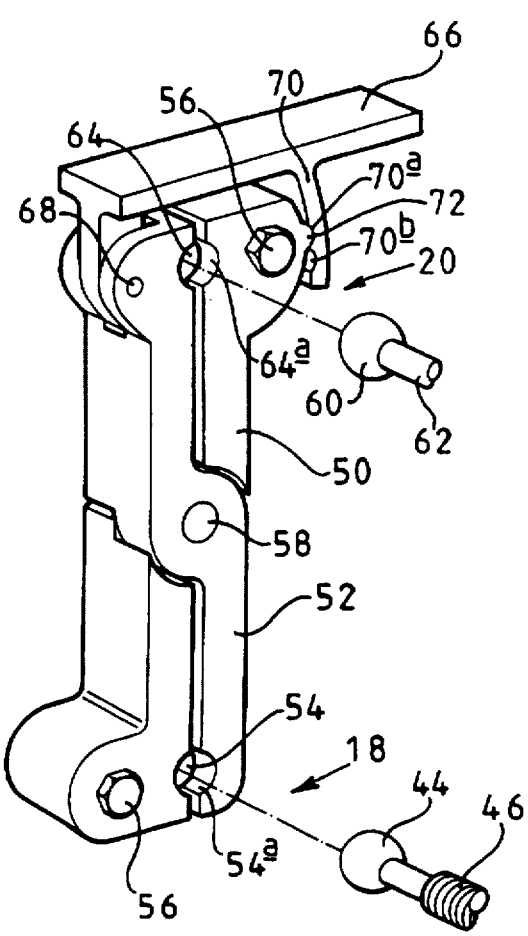

The first ball-and-socket joint 16 comprises a first part-spherical ball 22 (FIG. 2 only) on the end of a first adjusting screw 23 which is rotatably engaged in a first internally screw-threaded sleeve (not shown) on the support 10. The first ball-and-socket joint 16 further comprises a first socket 24 defined by a first pair of moulded arms 26 and 28 having mutually-cooperating socket parts. The first socket 24 has a smaller diameter entry region 24a. The arm 26 is secured on a pair of mounting bosses extending from the rear of the reflector body 12 at one side thereof by means of a pair of screws 30. The other arm 28 is pivotally mounted on the arm 26 by means of a pivot 32 whose axis extends parallel to that of the first adjusting screw 23. A latch element 34 is pivotally mounted on the arm 28 via a pivot pin 36 which also extends parallel to the axis of the first adjusting screw 23. The latch element 34 includes a downwardly-projecting and curved portion 38 having a pair of laterally extending, mutually parallel upper and lower grooves 38a and 38b therein. The arm 26 which is fixed to the reflector body 10 has a rib 40 on a side thereof opposite to the socket part and approximately at the same level as the pivot pin 36. The arrangement is such that the lower groove 38b is located further away from the pivot pin 26 than the upper groove 38a. The latch element 34 is formed of a suitably resilient, elastomeric material such that, by appropriate pivoting movement of the latch element 34, either the upper groove 38a or the lower groove 38b can be snap-engaged with the rib 40. When the latch element 34 is in the position in which the rib 40 and the upper groove 38a are inter-engaged, it will be appreciated that the arms 26 and 28 are in a relatively closed position in which the first ball 22 is non-detachably engaged in the first socket 24 defined by the mutually-cooperating socket parts. However, when the latch member 34 is pivoted by lifting it so that the rib 40 becomes snap-engaged in the lower groove 38b, the arms 26 and 28 are in a relatively open position sufficient to open the entry region 24a whereby to enable the first ball 22 to be disengaged from the first socket 24.

The second ball-and-socket joint 18 comprises a second part-spherical ball 44 on the end of a second adjusting screw 46 which is rotatably engaged in a second, internally screw-threaded sleeve 48 on the support 10. The second adjusting screw 46 is mounted on the opposite side of the headlamp assembly to the first adjusting screw 23 and with its axis parallel to but at a lower level than the first adjusting screw 23. The first adjusting screw 23 is provided near to the top of the headlamp assembly whereas the second adjusting screw 46 is located towards the bottom of the headlamp assembly. The second ball-and-socket joint 18 is defined by a further pair of arms 50 and 52 having mutually co-operating second socket parts defining a second socket 54 with smaller diameter entry region 54a. The arm 50 is secured by means of fixing screws 56 to respective bosses 58 extending from the rear of the reflector body 12, whilst the arm 52 is pivotally mounted at approximately mid-way along its length to the fixed member via a pivot pin 58 extending parallel to the axis of the second adjusting screw 46. The further pair of arms 50 and 52 are thus interconnected pivotally in a scissor-like manner.

The third ball-and-socket joint 20 comprises a third part-spherical ball 60 on the end of a post 62 fixed to the support 10. The post 62 is disposed vertically above the second adjusting screw 46 and is horizontally aligned with the first adjusting screw 23. The axis of the post 62 is parallel to those of the first and second adjusting screws 23 and 46. The third ball-and-socket joint 20 also comprises a third socket 64 with smaller diameter entry region 64a which is spaced vertically above the second socket 54 and is defined by respective mutually co-operating third socket parts which are disposed on the opposite side of the pivot 58 to the second socket 54. A second latch member 66 connected by a pivot pin 68 to the arm 52 is provided at the top of the further pair of arms 50 and 52 and, like the first latch element 34, has a downwardly projecting curved portion 70 with upper and lower grooves 70a and 70b thereacross which can be selectively snap-engaged with a rib 72 projecting from the arm 50. Thus, when the second latch element 66 is in a position such that the rib 72 is snap-engaged with the lower groove 70b, the arms 50 and 52 are in a relatively open position such that the second and third part spherical balls 44 and 60 can be engaged with/disengaged from the respective second and third sockets 54 and 64 via the relatively open entry holes 54a and 64a, whereas when the second and third part-spherical balls 44 and 60 are engaged in the respective second and third sockets 54 and 64 and the latch element 66 is in a position in which the rib 72 is snap-engaged in the upper groove 70a, the arms 50 and 52 are in a relatively closed position such that the second and third part-spherical balls 44 and 60 cannot be disengaged from the respective second and third sockets 54 and 64 because the entry holes 54a and 64a are relatively closed.

Thus, with both of the pairs of arm 26, 28 and 50, 52 in their relatively open positions, the reflector body 12 can be completely detached from the support 10, whilst with the pairs of arms 26, 28 and 50, 52 in their relatively closed positions, the reflector body 12 is held securely in position on the support 10 but nevertheless can be adjusted relative thereto by appropriate adjustment of the first and second adjusting screws 23 and 46 for beam aiming purposes.

In order to assist in re-engagement of the first, second and third part-spherical balls 22, 44 and 60 in the respective first, second and third sockets 24, 54 and 64, the entry holes 24a, 54a and 64a may be flared (see particularly FIG. 4). Both latch elements 34 and 66 are provided at the top of the headlamp assembly for ease of manual access.

Referring now to FIG. 5, there is shown a modification of the further pair of arms 50 and 52 where, instead of providing second latch element 66, the arms 50 and 52 are secured together by means of a manually operable screw 76 by means of which they can be moved between the relatively open and the relatively closed positions.

In FIG. 6, a simpler latch element 78 is illustrated which retains the arms 50 and 52 together in their relatively closed positions and which can be disengaged from arm 50 to allow the arms 50 and 52 to be opened to permit engagement/disengagement of the part-spherical balls 44 and 60 from the respective sockets 54 and 64.

What is claimed is:

1. A lamp assembly comprising a reflector body; means defining at least one rear opening in the reflector body for receiving a replaceable light bulb; a support; and an adjustment mechanism adjustably mounting said reflector body on said support, said adjustment mechanism comprising three ball-and-socket joints, a first pair of arms and a further pair of arms; wherein (i) each arm of said first pair of arms has a socket part thereon, the socket parts on the arms of said first pair of arms co-operating to define a socket of a first of said three ball-and-socket joints;

(ii) each arm of said further pair of arms has two spaced socket parts thereon;

(iii) each of said two socket parts on one of the arms of said further pair of arms co-operates with a respective one of said two socket parts on the other arm of said further pair of arms to define a respective socket of a second and a third of said three ball-and-socket joints;

(iv) the arms of said first pair of arms and the arms of said further pair of arms are respectively secured together for relative pivotal movement between (a) a relatively closed position in which balls are held in the respective sockets defined by the socket parts of the arms, and (b) a relatively open position in which the balls can be engaged with and disengaged from the respective sockets; and, (v) releasable retaining means are provided for releasably retaining the arms of said first pair of arms and the arms of said further pair of arms in said relatively closed position.

2. The lamp assembly according to claim 1, wherein means are provided for releasably retaining the arms of said first pair of arms and the arms of said further pair of arms in said relatively open position.

3. The lamp assembly according to claim 1, wherein the arms of said further pair of arms are pivotally connected together by a pivotal connection lying between the two sockets defined by said arms.

4. The lamp assembly according to claim 1, wherein said releasable retaining means comprise a latch element on one of the arms which snap-engages with a cooperating formation on the other arm to retain the arms of said first Pair of arms and the arms of said further pair of arms in said closed position.

5. The lamp assembly according to claim 4, wherein said latch element has a further cooperating formation thereon which is to retain the arms of said first pair of arms and the arms of said further pair of arms in the relatively open position.

* * * * *